July 30, 1929.  E. W. LOSSING  1,722,382
APPARATUS FOR VINEGAR MAKING
Original Filed April 2, 1926  2 Sheets-Sheet 2
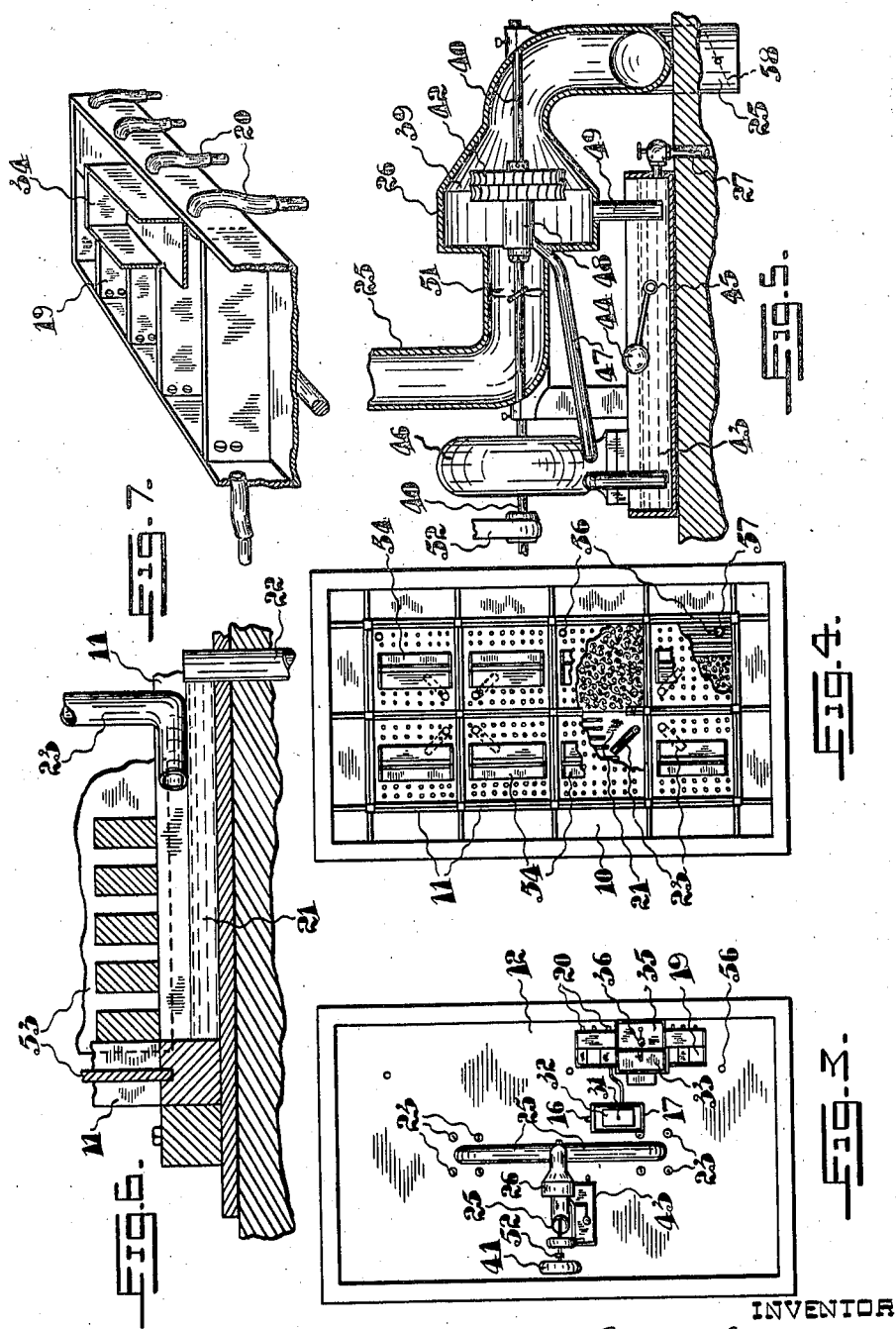

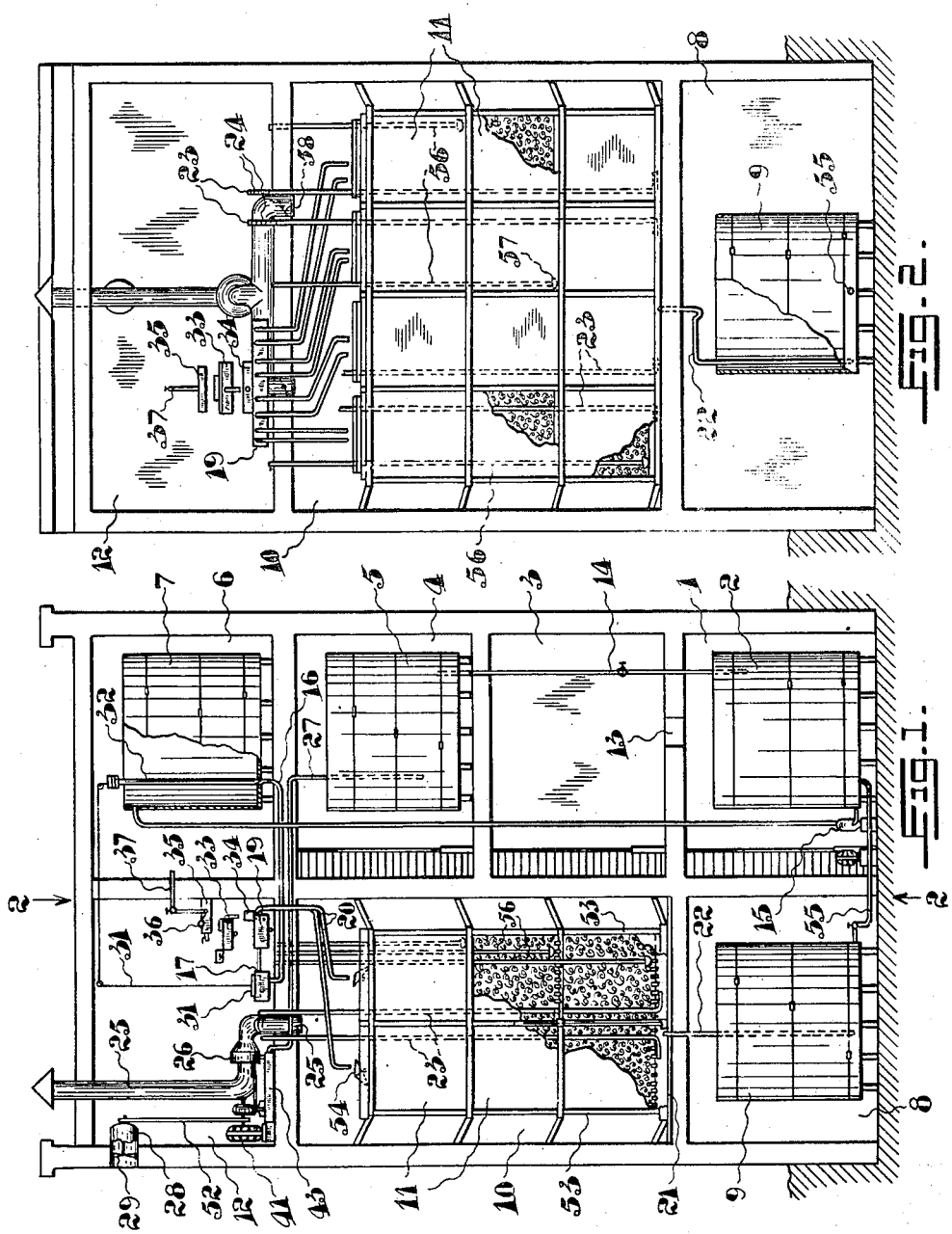

Patented July 30, 1929.

1,722,382

UNITED STATES PATENT OFFICE.

ELMER WILLIAM LOSSING, OF TORONTO, ONTARIO, CANADA.

APPARATUS FOR VINEGAR MAKING.

Application filed April 2, 1926, Serial No. 99,298. Renewed January 12, 1929.

This invention relates to the production of vinegar by the oxidation of a previously prepared mixture of vinegar, alcohol and water in generators in which the liquid mix trickles down over shavings or the like in the presence of a flow of air, and my object is to provide apparatus in which the actual production of vinegar approximates as closely as possible the theoretical possibility.
I attain my object by providing means whereby the air for the generator units is separately and controllably supplied to them from a common distributor room, by providing means for accurately controlling the volume of the mix supplied to the generator units and its times of dumping into the units and by providing means whereby the spent air from the generator units is washed by fresh water which is subsequently used in the preparation of the mix.

The apparatus is hereinafter described and illustrated in the accompanying drawings in which Fig. 1 is a side elevation more or less diagrammatic of a vinegar plant constructed in accordance with my invention;

Fig. 2 is a vertical section on the line 2—2 in Fig. 1 looking to the left;

Fig. 3 a plan view of the air distributing chamber and the parts located therein;

Fig. 4 a plan view of the generator chamber and the parts contained therein;

Fig. 5 a longitudinal section of the air washing apparatus;
Fig. 6 a sectional detail, on an enlarged scale, of part of the bottom of the generator unit; and Fig. 7 a perspective detail of the main siphon box.
In the drawings like numerals of reference indicate corresponding parts in the different figures.

A suitable building is preferably provided for the plant, preferably of four stories in height, whereby the different parts of the apparatus may be located at the different levels required. The building is also preferably divided vertically so that in one side four chambers are formed; a chamber 1 for the mix tank 2, a chamber 3 forming the mix room, a chamber 4 for the water supply tank 5, a chamber 6 for the distributor tank 7, and in the other side a chamber 8 for the receiving tank 8, a chamber 10, two stories in height, for the generator units 11, and an air distributing chamber 12 above the generator units. Suitable means of access to the different chambers will, of course, be provided. The generator units are of ordinary type adapted to contain wood shavings, over which the mix flows and picks up oxygen from the air supply to the generator units.

*The general arrangement of the mechanism.*

A mix tank 2 is located at the bottom of the plant beneath the mix room, in which the materials other than water are combined and dumped through the opening 13 into the mix tank. Water, as required for the mix, is drawn from the water supply tank 5 through the valve controlled pipe 14. The mix, by means of the pump 15, is pumped up from the mix tank to the distributor tank 7. From the bottom of this tank a pipe 16 conveys the mix to a float tank 17, from which it is led by means of a pipe to the main siphon tank 19, which tank discharges the mix through the pipes 20 to the distributors of the generator units 11, which are shown to be eight in number, but may be more.

The generator units have a common bottom chamber 21, from which leads a discharge pipe 22 to the receiving tank 9. The air supply to the generator units is by means of air pipes 23, one for each unit. These air pipes open into the air distributing chamber 12 and lead to the bottom of each unit. Any suitable means for controlling the flow of air through these pipes will be provided. Usually the upper end of each pipe will be provided with a plurality of openings 24, one or more of which may be plugged as desired.

From the generator chamber leads an air conduit 25 extending to the outer air. In this air conduit is located air washing apparatus 26, whereby all soluble fumes in the air may be removed. A water discharge pipe 27 from the air washing apparatus leads to the water supply tank 5 to be used in the fresh mix. The air inlet 28 into the air distributing chamber may be provided with a fan 29 to assist the natural circulation.

*The mix distributing system.*

As hereinbefore stated, the mix from the distributor tank passes to the float tank 17. In this tank is located a float 30, to which is connected a cable 31 led over suitable guide pulleys to a vertically movable valve 32 controlling the outlet from the distributor tank to the pipe 16. When the float chamber is full, the outflow from the distributor tank is cut off. Ordinarily the dumping is controlled by the mix itself. As, however, the mix contains a good deal of solid matter, it cannot be relied upon at all times to flow at the same rate and irregularity in the supply of the mix to the generator units results, which is harmful. I therefore provide means whereby the dumping of the main siphon tank is controlled by the flow of pure water. Above the main siphon tank which is of the known tipping variety, is located a master siphon tank 33 adapted to tip, when full, and discharge its contents into the balance box 34 of the main siphon tank 19. The supply of fresh water to the master siphon tank is from a tank 35, in which a constant head is maintained through the medium of a float valve 36 controlling the water supply pipe 37. As soon as the master siphon tank is filled, it tips and fills the balance box 34, thus tipping the main siphon tank 19 and discharging its contents to the generator units. The main siphon tank is provided with partitions 38, from which the separate pipes 20 lead to the generator units.

*The air washing apparatus.*

The air conduit 25 has a chamber 39 formed therein, in which is journalled a shaft 40 driven by an electric motor 41. On the shaft is secured a double impeller 42, one side of this impeller impels the entering air to the outer part of the chamber, while water led to the other side of the impeller is also thrown outwardly resulting in bringing the air and water into intimate contact so that the water absorbs any soluble fumes in the air.

The water supply is obtained from the tank 43, in which a constant level is maintained by means of the float valve 44 controlling the water supply pipe 45 connected with any suitable source. A pump 46 is driven by the shaft 40, its suction extending into the tank 43, while its discharge pipe 47 is provided with a nozzle 48 concentric with the shaft and discharging against the adjacent side of the impeller 42. The chamber 39 drains, by means of a pipe 49, to the tank 43. A valve controlled pipe 27 leads from the tank 43 to the water supply tank 5. A thorough washing of the spent air from the generator units is thus ensured with the result of saving all of the valuable fumes therein.

An air fan 51 may be secured to the shaft 40 within the air conduit to assist the natural draft. The fan 29, hereinbefore referred to, may be driven by means of an arrangement of pulleys and belts 52 from the shaft 40.

*The generator units and air distribution.*

In the main the arrangement of the generator units and the air supply thereto has been fully described. One or two points, however, in connection therewith require some elaboration. It will be noted that though the generator units have a common bottom chamber 21, the dividing walls 53 extend down into this chamber, while the discharge pipe 22, leading from the bottom chamber, extends up into the chamber to a point above the level of the lower edge of the partitions so that a liquid seal is maintained in the bottom chamber 21, at all times isolating the distributor units so that the air supply for one cannot pass to any of the others, thus the air supply to each generator unit may be absolutely controlled in the manner hereinbefore set forth. The generator units will each be provided with the usual tipping distributor 54. A valve controlled pipe 55 extends from the receiving tank 9 to the mix tank 2 so that the contents of the receiving tank can be passed back to the mix tank to be used as part of new mix.

Test pipes 56 are run from the air distributing chamber into the generator units through which thermometers may be lowered to take the internal temperatures or through which samples may be withdrawn from cups 57 located at the lower ends of the pipes in such a manner as to seal them against the admission of air. A damper 58 may be located in the conduit 25 to control or assist in controlling the air flow through and from the generator units.

It will be found with the apparatus described that I can obtain absolute control of the volume and temperature of air to each generator unit, since the temperature of the air in the distributing chamber can always be raised or lowered with suitable apparatus as may be necessary. Absolute control of the volume and temperature of the mix to each generator unit is also obtained, since the control of the flow is by means of pure water under a constant head and the temperature in the generator units depends largely on the rate of oxidization which depends on the rate of air flow and the rate of supply of the mix. It also gives absolute control of the time periods of each dump of the siphon box and the quantity of mix supplied to the generator units, each unit receiving the same quantity of mix. As all the air from the generator units must pass through the air washing apparatus, no waste takes place through the medium of the spent air. The apparatus, therefore, approximates very closely to the maximum production of vinegar theoretically possible from a given quantity of alcoholic mix.

If during operation it appears that aldehydes are being formed and are passing away in the spent air, hydrogen may be introduced into the washing apparatus to neutralize the aldehydes so that they may be recovered in the washing water.

What I claim is:

1. In vinegar making apparatus, the combination of an air distributing chamber having an air inlet; a closed generator chamber; a plurality of generator units open to said chamber; a separate air supply pipe for each generator unit leading from the air distributing chamber; and a spent air outlet from the generator chamber.

2. In vinegar making apparatus, the combination of an air distributing chamber having an air inlet; a closed generator chamber; a plurality of generator units open to said chamber; a separate air supply pipe for each generator unit leading from the air distributing chamber; an air outlet from the generator chamber; and for independently controlling the air flow through each of the air supply pipes.

3. In vinegar making apparatus, the combination of an air distributing chamber having an air inlet; a closed generator chamber; a plurality of generator units open to said chamber; a separate air supply pipe for each generator unit leading from the air distributing chamber; an air outlet from the generator chamber; and air washing apparatus with which the said air outlet communicates.

4. In vinegar making apparatus, the combination of a water tank for the mix; a mix tank; a valve controlled pipe leading from the water tank to the mix tank; a distributor tank; means for pumping the mix to the distributor tank; a closed generator chamber; a plurality of generator units open to said chamber; means for distributing the mix from the distributor tank to the generator units; means for supplying air to the generator units; an air outlet from the generator chamber; air washing apparatus with which the said air outlet communicates; and means for conveying used water from the air washing apparatus to the water tank.

5. In vinegar making apparatus, the combination of a water tank for the mix; a mix tank; a valve controlled pipe leading from the water tank to the mix tank; a distributor tank; means for pumping the mix to the distributor tank; a closed generator chamber; a plurality of generator units open to said chamber; means for distributing the mix from the distributor tank to the generator units; an air distributing chamber having an air inlet; a separate air supply pipe for each generator unit leading from the air distributing chamber; an air outlet from the generator chamber; air washing apparatus with which the said air outlet communicates; and means for conveying used water from the air washing apparatus to the water tank.

6. In vinegar making apparatus, the combination of an air distributing chamber having an air inlet; a closed generator chamber; a plurality of generator units open to said chamber; a separate air supply pipe for each generator unit leading from the air distributing chamber; an air outlet from the generator chamber; and an air fan adapted to force air into the air distributing chamber.

7. In vinegar making apparatus, the combination of a generator unit; means for supplying mix thereto; means for leading off spent air therefrom; means for supplying fresh water for the mix; means for utilizing the fresh water supply to wash the spent air and conveying it to the mix.

8. In vinegar making apparatus, the combination of a generator; an air conduit leading from the generator having a chamber formed therein; a rotary agitator located in said chamber; a tank; means for pumping water from the tank and discharging it against the rotary agitator; an outlet pipe from the said chamber extending down into the tank; a float valve for introducing water to the tank and maintaining a constant level therein; and an outlet pipe from the tank through which the washing water may be led to be used in the mix for the generator.

9. In vinegar making apparatus, the combination of a generator; a distributor tank for the mix; a tipping siphon tank provided with a balance box; an outlet pipe leading therefrom to the generator; a float chamber connected with the siphon tank; a float therein; a valve controlled pipe leading from the distributor tank to the float chamber; connections whereby the float controls the flow through said pipe; a source of water supply under constant head; and a master siphon tank fed from said source adapted, after a predetermined quantity of water has been received therein, to discharge its contents into the balance box to thus tip the siphon tank and cause it to discharge its contents to the generator.

10. In vinegar making apparatus, the combination of an air distributing chamber having an air inlet; a closed generator chamber; a plurality of generator units open to said chamber; a separate air supply pipe for each generator unit leading from the air distributing chamber; a spent air outlet from the generator chamber; and means for independently controlling the air flow through each generator unit.

11. In vinegar making apparatus, the combination of an air distributing chamber having an air inlet; a plurality of generator units taking their air from said chamber independently of one another; an air conduit for spent air with which the generator units communicate; and means for independently controlling the flow of air through each generator unit.

12. In vinegar making apparatus, the combination of an air distributing chamber having an air inlet; a plurality of generator units taking their air independently of one another from said chamber; an air conduit for spent air with which the generator units communicate; and means for controlling the flow of air through each generator unit separately and for varying the total flow of air.

13. In vinegar making apparatus, the combination of an air distributing chamber having an air inlet; a plurality of generator units taking their air independently of one another from said chamber; an air conduit for spent air with which the generator units communicate; means for controlling the flow of air through each generator unit; and a test pipe extending down into each generator unit from the air distributing chamber.

14. In vinegar making apparatus, the combination of an air distributing chamber having an air inlet; a plurality of generator units taking their air from said chamber; an air conduit for spent air with which the generator units communicate; means for independently controlling the flow of air through each generator unit; means for introducing to the generator units the mix at predetermined intervals; and means for accurately timing said intervals and for varying the timing.

15. In vinegar making apparatus, the combination of an air distributing chamber having an air inlet; a closed generator chamber directly below the air distributing chamber; a plurality of generator units open to said chamber; a separate air supply pipe for each generator unit leading from the air distributing chamber; and a spent air outlet from the generator chamber.

16. In vinegar making apparatus, the combination of an air distributing chamber having an air inlet; a closed generator chamber directly below the air distributing chamber; a plurality of generator units open to said chamber; a separate air supply pipe for each generator unit leading from the air distributing chamber downwardly through the generator unit to its lower end; and a spent air outlet from the generator chamber.

17. In vinegar making apparatus, the combination of an air distributing chamber having an air inlet; a closed generator chamber; a plurality of generator units open to said chamber; a separate air supply pipe for each generator unit leading from the air distributing chamber; and a spent air conduit leading from the generator chamber and passing through the air distributing chamber.

18. In vinegar making apparatus, the combination of an air distributing chamber having an air inlet; a closed generator chamber directly below the air distributing chamber; a plurality of generator units open to said chamber; a separate air supply pipe for each generator unit leading from the air distributing chamber downwardly through the generator unit to its lower end; and a spent air conduit leading from the generator chamber and passing through the air distributing chamber.

Signed at Toronto, Canada, this 12th day of March, 1926.

ELMER WILLIAM LOSSING.